Aug. 18, 1931. H. A. DECH 1,819,544
WEEDING APPARATUS
Filed Oct. 23, 1930 2 Sheets-Sheet 2
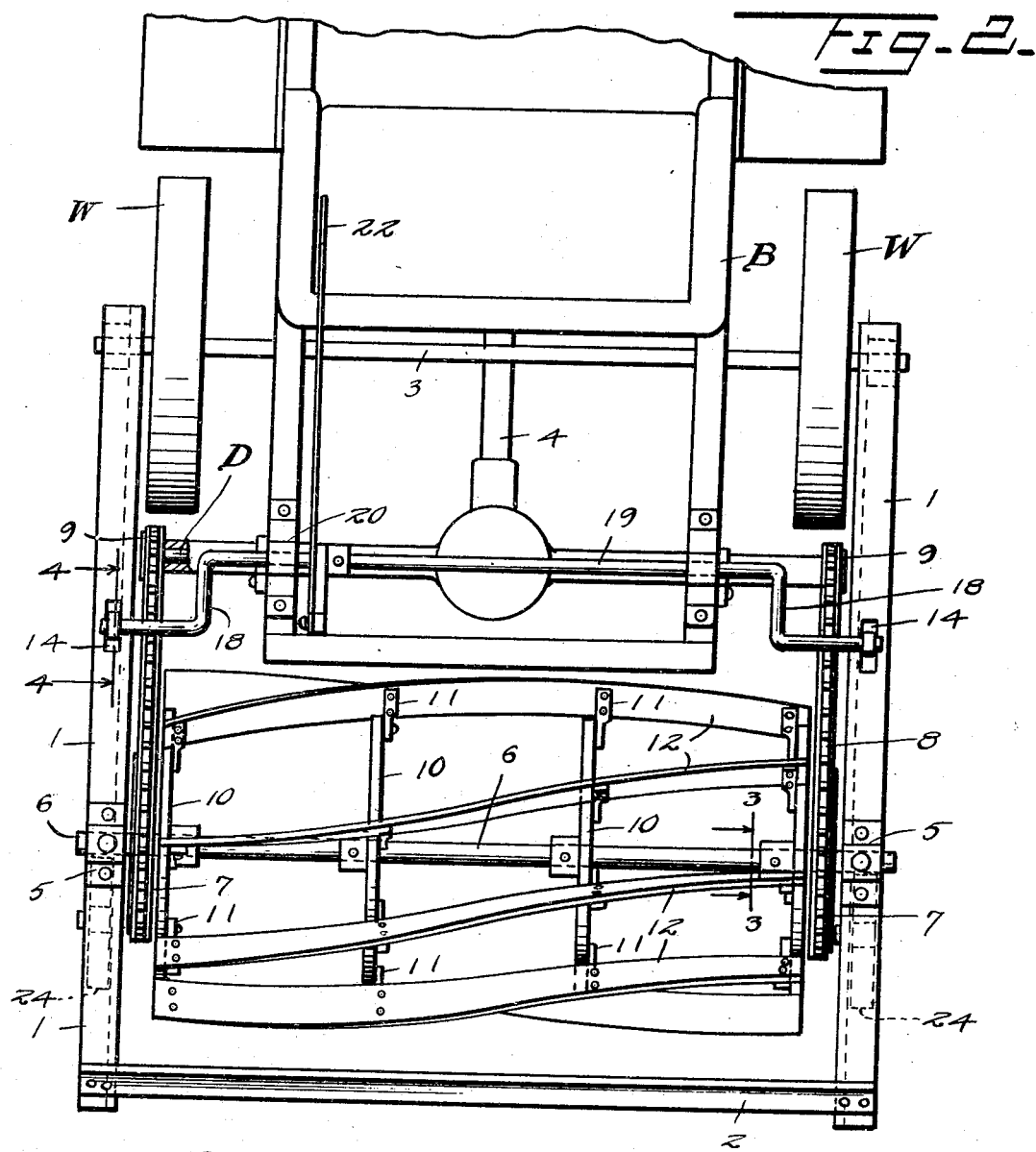
Fig. 2.
Fig. 3.
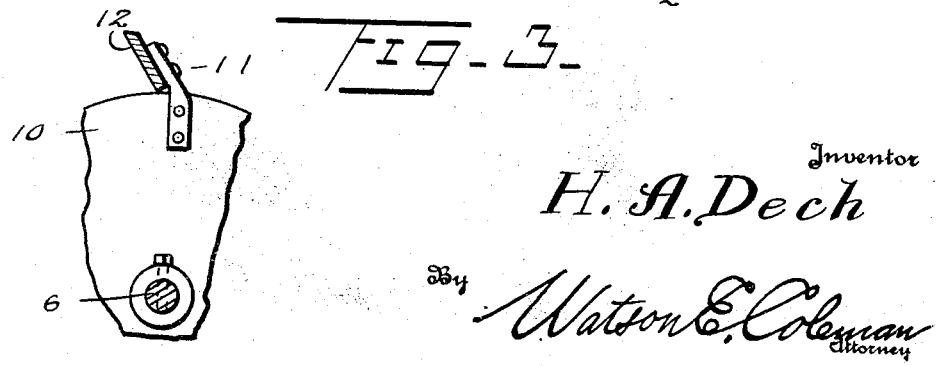
Inventor
H. A. Dech
By Watson E. Coleman
Attorney Patented Aug. 18, 1931

1,819,544

UNITED STATES PATENT OFFICE

HERBERT A. DECH, OF NORTHAMPTON, PENNSYLVANIA

WEEDING APPARATUS

Application filed October 23, 1930. Serial No. 490,744.

This invention relates to a welding apparatus, and it is an object of the invention to provide an apparatus of this kind embodying a rotating element carrying a series of spirally disposed ground working blades whereby the soil is treated in a manner to effectively destroy weeds and kindred plants.

It is also an object of the invention to provide a device of this kind comprising a rotary ground working member supported for movement in a vertical direction, together with means for regulating the extent of penetration of the member within the ground.

Another object of the invention is to provide a device of this kind comprising a rotating ground engaging member supported for movement in a vertical direction, together with means for facilitating the lowering of said member for working action upon the ground.

The invention consists in the details of construction and in the combination and arrangement of the several parts of my improved weeding apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 2 is a view in top plan of the device as illustrated in Figure 1;

Figure 3 is an enlarged fragmentary sectional view taken substantially on the line 3—3 of Figure 2;

Figure 4 is a detailed sectional view taken substantially on the line 4—4 of Figure 2.

Figure 1:
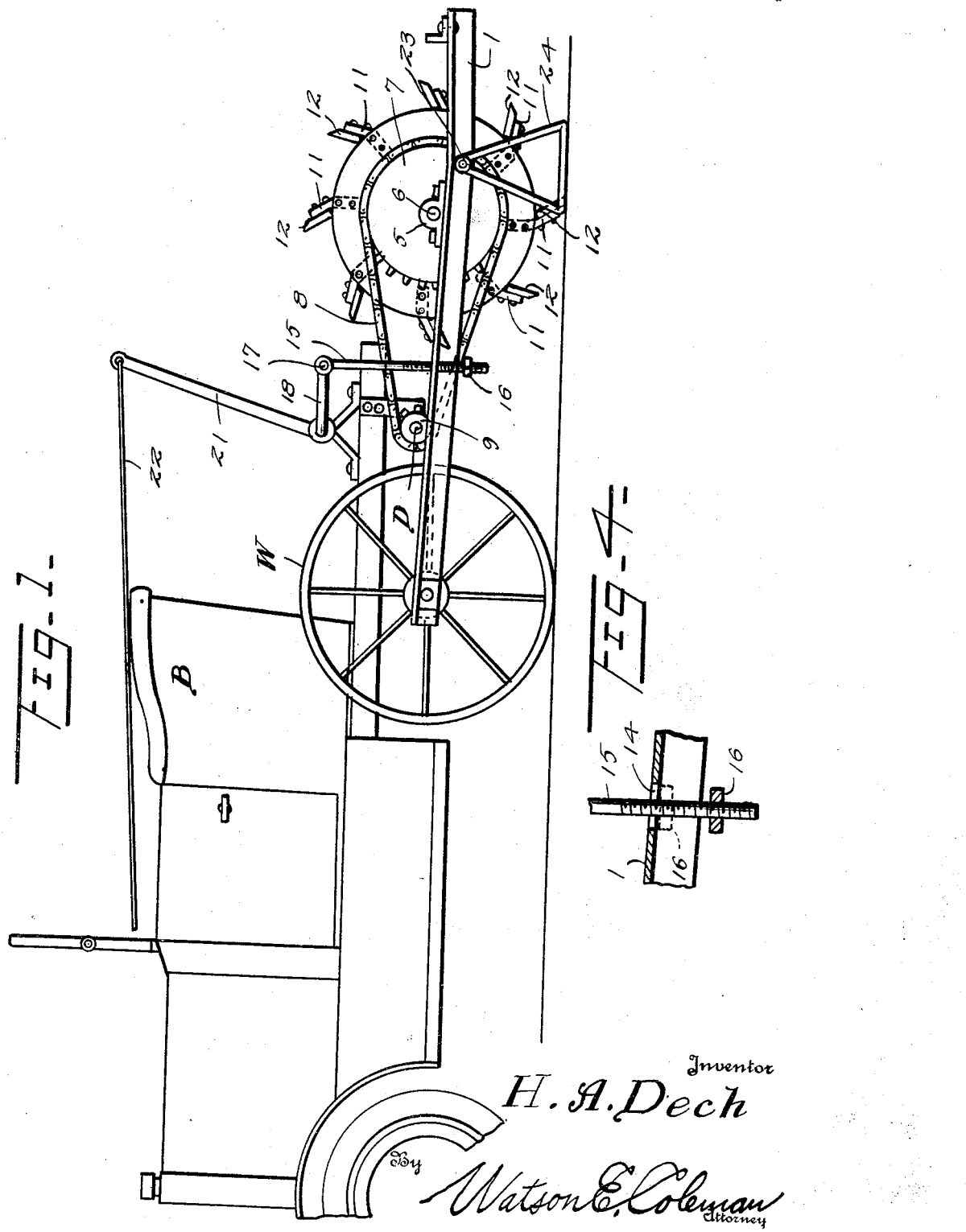
Figure 1 is a view in side elevation illustrating a weeding apparatus constructed in accordance with an embodiment of my invention.

As herein disclosed, my improved apparatus comprises a substantially U-shaped frame F consisting of the side members 1 and an outer cross member 2. The forward or free end portions of the side members 1 of the frame are rotatably engaged with a transversely disposed axle or member 3 carried by a portable body B, said axle 3 having mounted thereon ground engaging wheels W for supporting the rear portion of the body B. The body B, as herein referred to, is adapted to include the portable structure in its entirety and which includes a drive shaft D positioned rearwardly of the wheels W and which shaft is in driven connection, as indicated generally at 4, with a suitable motor carried by the body B.

The side members 1 inwardly of the cross member 2 are provided with the bearings 5 providing mountings for the opposite end portions of a shaft 6.

Each end portion of the shaft 6 has fixed thereto a relatively large sprocket wheel 7 which is operatively engaged through the medium of the sprocket chain 8 with a smaller sprocket wheel 9 fixed to an end portion of the shaft D.

The shaft 6 at predetermined points therealong has fixed thereto the discs 10 of substantially the same diameters and which have fixed to their peripheral portions the outstanding and substantially radially disposed arms 11. These arms 11 are so positioned upon the discs 10 to provide effective attaching means for the elongated cutting blades 12 each of which longitudinally being spirally disposed. It is also to be noted that each of the blades 12 is of a length to be connected to all of the discs 10.

The discs 10 and blades 12 together with the shaft 6 provide a rotating weeding element which operates effectually upon the soil over which it works to destroy weeds or the like, and by limiting the downward movement of the frame F the extent of penetration of the blades 12 into the ground may be regulated. As herein disclosed, this regulation is accomplished by providing each of the side members 1 of the frame with an elongated slot 14 through which passes an end portion of a rod 15. The rod 15 below the adjacent side member 1 has threaded thereon a stop member or nut 16 so that by changing the location of the member or nut 16 upon the rod 15 the limit of downward movement of the frame F may be effectively regulated.

The upper portion of each of the rods 15 is operatively connected, as at 17, with a rock arm 18 carried by a shaft 19. This shaft 19 is disposed transversely of the body B and is rotatably supported by the bearings 20 suitably mounted upon the body B. The shaft 19 at a desired point intermediate its ends is provided with an outstanding lever 21 to which is engaged a suitable operating member 22 leading forwardly of the body B for the ready and convenient access by the occupant of the body B so that the frame carrying the rotating weeding element may be readily raised and lowered as desired.

One of the side members 1 of the frame has pivotally connected, as at 23, to the rear portion thereof a prop or supporting member 24. As particularly illustrated in Figure 1, this member 24 is triangular in form and provides means when the frame F is initially lowered from a raised position to prevent any of the blades 12 having sudden or abrupt contact with the ground or other support. As the apparatus moves, however, the supporting member or prop 24 will readily swing to one side of the vertical and thereby offer no hindrance or obstruction to the desired penetration of the blades 12 into the soil.

It is also to be particularly noted that in the present embodiment of my invention the rotating weeding element constitutes the driving means for the apparatus, thus materially facilitating the efficiency of the apparatus.

From the foregoing description it is thought to be obvious that a weeding apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus of the class described comprising a frame, means for supporting the frame for movement in a vertical direction, a ground working means carried by the frame, means for raising the frame, and a freely movable prop carried by the frame for limiting its downward movement.

2. An apparatus of the class described comprising a frame, means for supporting the frame for movement in a vertical direction, a ground working means carried by the frame, means for raising the frame, and a prop carried by the frame for limiting its downward movement, said prop being pivotally connected to the frame.

In testimony whereof I hereunto affix my signature.

HERBERT A. DECH.